United States Patent [19]

Basola et al.

[11] 4,345,930

[45] Aug. 24, 1982

[54] PROCESS AND APPARATUS FOR SPHERICALLY CURVING AN END OF AN OPTICAL FIBER

[75] Inventors: Carlo P. Basola; Guido Chiaretti, both of Milan, Italy

[73] Assignee: Cselt Centro Studi e Laboratori Telecomunicazioni S.p.A., Turin, Italy

[21] Appl. No.: 213,623

[22] Filed: Dec. 5, 1980

[30] Foreign Application Priority Data

Dec. 7, 1979 [IT] Italy .............................. 69356 A/79

[51] Int. Cl.³ ...................... B29D 11/00; C03B 37/14
[52] U.S. Cl. ............................................ 65/102; 65/2; 65/12; 65/158; 65/292; 264/1.5; 264/2.7; 264/40.1
[58] Field of Search .................. 264/1.2, 1.4, 1.5, 2.7, 264/40.1; 65/12, 102, 158, 160, 162, 269, 296, 2, 292

[56] References Cited

U.S. PATENT DOCUMENTS

| | | | |
|---|---|---|---|
| 2,189,860 | 2/1940 | Frei, Jr. .............................. | 65/102 |
| 2,300,917 | 11/1942 | Gaskill ............................... | 65/269 |
| 2,530,692 | 11/1950 | Gage .................................. | 65/102 |
| 3,113,010 | 12/1963 | Willis et al. ...................... | 65/292 |
| 3,486,875 | 12/1969 | Pymm ................................ | 65/158 |
| 4,280,827 | 7/1981 | Murphy et al. ................... | 65/160 |

OTHER PUBLICATIONS

"Design Criteria for Optimum Coupling between a High Radiance LED and a Bulb-Ended Fiber", Basola et al., *CSELT Rapporti Technici,* vol VI, N. 4, Dec. 1978, pp. 279-285.

*Primary Examiner*—James B. Lowe
*Attorney, Agent, or Firm*—Karl F. Ross

[57] ABSTRACT

In order to provide an end face of an optical fiber with a spherical curvature of predetermined radius, designed to optimize the transfer of luminous intensity from an adjoining light source such as a light-emitting diode, a flat fiber is heated to a temperature near its melting point while its profile is optically enlarged. When that profile is found to have reached a predetermined shape criterion, as determined by visual observation or by electronic scanning, heating is terminated.

7 Claims, 1 Drawing Figure

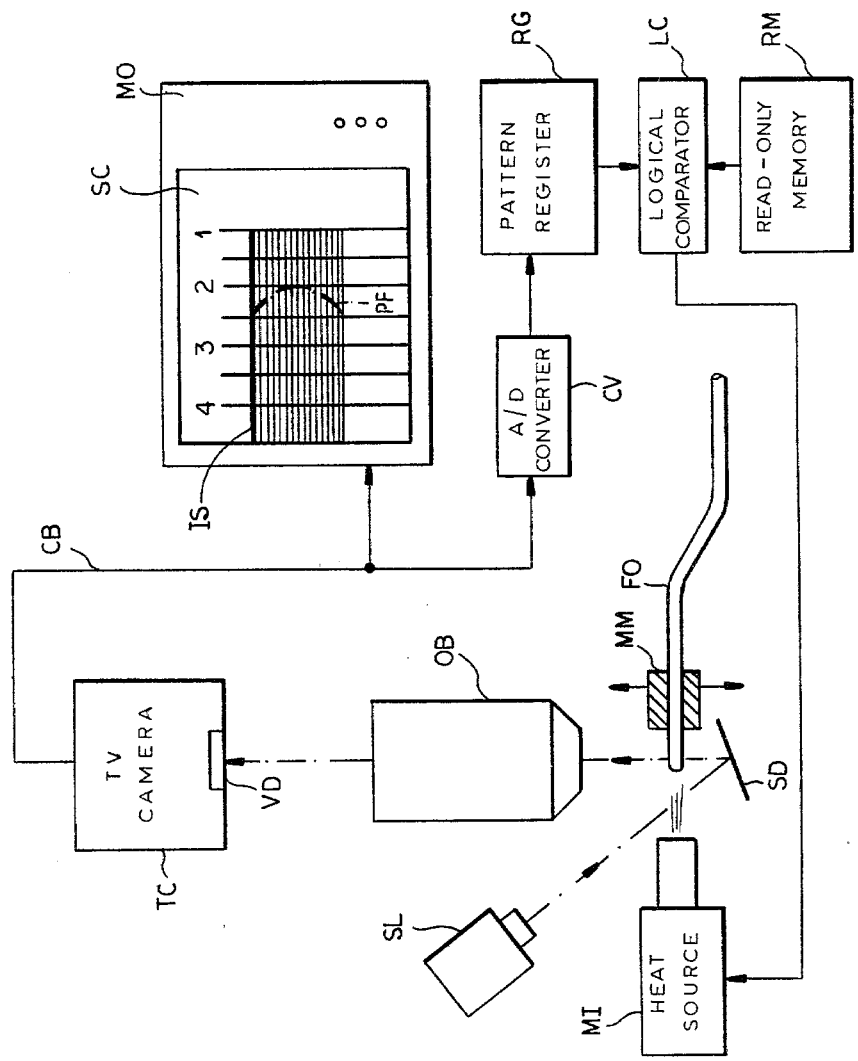

PROCESS AND APPARATUS FOR SPHERICALLY CURVING AN END OF AN OPTICAL FIBER

FIELD OF THE INVENTION

Our present invention relates to a process and an apparatus for spherically curving an end of an optical fiber to optimize the transfer of luminous energy thereto from an adjoining light source.

BACKGROUND OF THE INVENTION

It is known that the illumination of a fiber end by a signal-modulated light source, such as a light-emitting diode, can be made more efficient if the rays from that source are concentrated with the aid of an interposed collective lens. The same effect can be had if the fiber end itself is given a spherical shape so as to act as a focusing means.

In an article entitled "Design Criteria For Optimum Coupling Between a High-Radiance LED and a Bulb-Ended Fiber", published by our assignee in CSELT RAPPORTI TECNICI Volume VI, No. 4 dated December 1978, we have described the results of a study carried out with bulb-ended (i.e. convex-faced) optical fibers having different radii of curvature in a range of 45 to 100μ.

Such a curvature can be achieved by utilizing the surface tension of the vitreous material from which the fiber is made. Thus, the fiber end to be shaped is heated to a temperature near its melting point whereby its radius of curvature is caused to pass rather rapidly from infinity to a minimum value, followed by an increase. Since only a small deviation from the optimum radius can entail a considerable loss in transfer rate, careful control of the operation is required to insure a prompt termination of the heating process when the desired curvature has been reached.

OBJECTS OF THE INVENTION

An important object of our present invention, therefore, is to provide a process for facilitating the shaping of an end face of an optical fiber by the aforedescribed technique to a desired curvature.

A related object is to provide a simple apparatus for carrying out this process.

SUMMARY OF THE INVENTION

In accordance with our present invention, an originally flat fiber end is heated to an elevated temperature near its melting point while an enlarged image of the profile of that end is projected upon a receiving surface. Changes in the shape of this image at that elevated temperature are continuously monitored and the heating step is terminated when the image reaches a shape satisfying a predetermined criterion.

Such a criterion will usually be the radius of curvature but, as described hereinafter, may also be a certain axial shift connoting a contraction of that fiber end closely related to a change of radius.

An apparatus according to our invention, to be used in performing the process, comprises stationary mounting means for holding an extremity of the initially flat-ended optical fiber, heat source (e.g. a laser or a microtorch) axially aligned with the mounting means for confronting the end face of the fiber extremity to raise its temperature to the elevated level referred to, magnifying means forming a light beam which transversely intersects the axis of the fiber extremity to its end face to project an enlarged image of its profile upon a receiving surface, and a recording of a predetermined criterion for the shape of the fiber end, this recording being disposed for instantaneous comparison with the projected profile image to enable a deactivation of the heat source upon detection of substantial agreement between that criterion and the projected image. Such a recording could be a marking on a screen of a television receiver, or a preferably electronic data store.

BRIEF DESCRIPTION OF THE DRAWING

The above and other features of our invention will now be described in detail with reference to the accompanying drawing the sole FIGURE of which diagrammatically shows a representative embodiment.

SPECIFIC DESCRIPTION

In the drawing we have shown an extremity of an optical fiber FO whose end face is to be spherically curved and which is clamped for this purpose in a universally displaceable mounting MM for axial alignment with a heat source MI here shown as a microtorch.

A projector SL directs a beam of light upon a mirror SD at such an angle that the reflected beam transversely intersects the axis of fiber extremity FO near the originally flat end face thereof. An objective OB focuses a silhouetted image of the profile of that end face upon a receiving surface here represented by the photocathode VD of a television camera TC. The latter is connected by a cable CB to a television receiver MO having a screen SC on which the projected profile image IS appears.

A curve PF marked on the screen SC represents the shape which the enlarged profile is to attain during the heating step, namely a convex curvature of predetermined radius. Thus, the operator may turn off the microtorch MI as soon as the right-hand edge of the silhouette IS substantially coincides with or parallels the curve PF. The time needed for reaching this stage depends, of course, on the size of the microtorch flame which should be so adjusted that the change in curvature is sufficiently gradual to let the operator discontinue the heating at the right moment. Curve PF may be one of several such markings of like or different radii.

As noted above, the attainment of a given radius of curvature is accompanied by a certain axial foreshortening of the fiber extremity which can be empirically determined. Thus, vertical lines 1-4 drawn upon the screen SC can be used to detect the instant when the fiber face has axially receded toward the mounting MM to the extend known to correspond to a desired curvature. For this purpose it is merely necessary to align the end of silhouette IS with, say, line 1 at the beginning of the heating step and to observe the leftward shift of that end on the screen until it merely touches a certain other line, e.g. line 2 in the illustrated instance.

The aforedescribed observations could, of course, also be made with a profile image directly projected onto a screen by an optical system of large magnification ratio. The use of a television camera and receiver, however, is advantageous in that it simplifies the adjustment of image position and intensity; furthermore, it enables an automatic deactivation of the heat source MI in addition to or instead of manual cutoff based on visual observation. For this purpose we have shown a connection from cable CB via an analog/digital converter CV to a pattern register RG which, under the control of the sweep circuits of camera TC, stores at the end of such television frame a set of binary signals corresponding to the silhouette IS. A signal pattern representing the desired profile curvature and/or axial length is written in a read-only memory RM having output connections to one set of inputs of a logical comparator LC whose other set of inputs are connected to register RG. When the pattern of data temporarily stored in register RG substantially matches the one permanently inscribed in memory RN, comparator LC emits a command deactivating the heat source MI.

We claim:

1. A process for providing an end face of an optical fiber with a convex curvature optimizing the transfer of luminous energy thereto from an adjoining light source, comprising the steps of:

heating a flat end of a stationary fiber by an axially aligned that source to an elevated temperature near the melting point of the fiber material;

projecting an enlarged image of the profile of the fiber end upon a receiving surface during the heating step;

monitoring changes in the shape of said image at said elevated temperature; and terminating the heating of said fiber end upon said image reaching a shape satisfying a predetermined criterion.

2. A process as defined in claim 1 wherein heating is terminated upon said image conforming to a predetermined radius of curvature.

3. A process as defined in claim 1 wherein heating is terminated upon said image undergoing a predetermined axial shift connoting a foreshortening of the fiber and correlated with a certain radius of curvature.

4. A process as defined in claim 1, 2 or 3 wherein said image is electronically scanned at successive instants to produce a varying signal pattern which is compared with a prerecorded pattern to stop the heating of the fiber end upon detection of a substantial coincidence of said patterns.

5. An apparatus for providing an end face of an optical fiber with a convex curvature optimizing the transfer of luminous energy thereto from an adjoining light source, comprising:

stationary mounting means centered on an axis for holding an extremity of an optical fiber initially having a flat end face;

a heat source coaxial with said mounting means for confronting the end face of a fiber extremity held thereby and raising the temperature of said end face to a level near the melting point thereof;

magnifying means forming a light beam transversely intersecting said axis at said end face for projecting an enlarged image of the profile of said extremity upon a receiving surface; and a recording of a predetermined criterion for the shape of said fiber end disposed for instantaneous comparison with the projected profile image for enabling a deactivation of said heat source upon detection of substantial agreement between said image and said criterion.

6. An apparatus as defined in claim 5 wherein said magnifying means includes a screen of a television receiver, said recording comprising a marking on said screen.

7. An apparatus as defined in claim 5 wherein said recording comprises a data store, further comprising scanning means for converting said projected image into a varying signal pattern and comparison means connected to said scanning means and to said data store for emitting a stop command upon detection of a substantial match between said signal pattern and the contents of said data store.

* * * * *